Patented Sept. 15, 1931

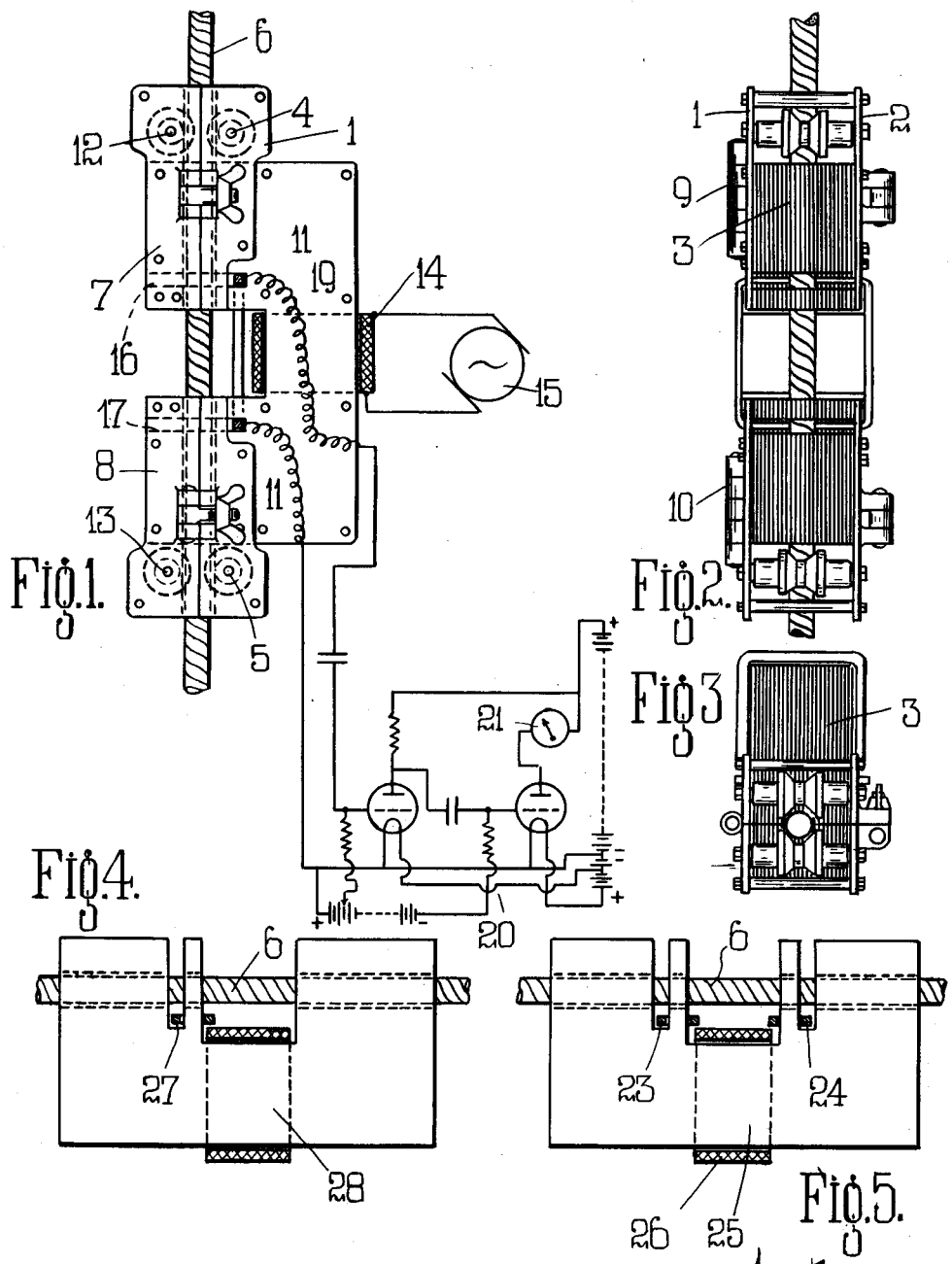

1,823,810

UNITED STATES PATENT OFFICE

THOMAS FREDERICK WALL, OF SHEFFIELD, ENGLAND

ELECTROMAGNETIC TESTING OF STEEL WIRE ROPES AND OTHER ARTICLES OF MAGNETIZABLE MATERIAL

Application filed December 20, 1928, Serial No. 327,301, and in Great Britain December 20, 1927.

The present invention relates to the electromagnetic testing of wire ropes and like articles of magnetizable material.

Apparatus is already known in which an article to be tested is passed through a magnetic field produced by an exciting coil in combination with a laminated yoke, and the variation of flux passing through said article due to flaws therein detected by means of a search coil linking substantially the whole of the flux passing through said article.

According to this invention a selected and relatively small portion or band of the total flux passing through the article to be tested is caused, at suitable places in the path of the flux, to follow a separate path in parallel with that of the main body of flux and to be linked by a search coil.

This small portion or band of flux is so selected that its path through the yoke is relatively short, whilst its path through the article to be tested is also short and through a region of maximum flux density.

Further, the yoke is so constructed that its cross sectional area is large compared with that of the yoke, so that the density of flux in the yoke is relatively low.

Thus, the density of the selected band of flux is relatively small in its path through the yoke.

In testing by electromagnetic means steel wire ropes such as are used for winding and hauling in collieries, among the difficulties which are encountered is the effect on the magnetic permeability of the rope of local strains in the material of the rope, such local strains being of themselves of no importance in so far as the strength of the rope is concerned.

To obviate this difficulty the portion of the rope which is under test is magnetized to a high value of flux density, the effect of local strains on the magnetic permeability being thereby diminished.

In order to develop a high flux density in the rope it is known to be practically necessary to provide a magnetic circuit which shall be mainly of iron and it is desirable so to dimension the parts of the magnetic circuit of which the portion of the rope under test forms part, that, whilst the flux density in the portion of the rope under test is large, the flux density in the rest of the magnetic circuit shall be relatively low.

Further by this invention, in order that any small eccentricity between the rope and the surface of each hole in the magnetic yoke shall not seriously affect the test results, the air space between the rope and the surface of each hole in the magnetic yoke is arranged to be relatively of considerable length in the direction of the lines of force which cross these air spaces.

For the excitation of the magnetic circuit it is preferable to use alternating current and to employ a low frequency although the use of direct current excitation is not excluded.

The invention is more particularly described with reference to the accompanying drawings in which:—

Figure 1 is one form of construction in side elevation.

Figure 2 is a corresponding front view.

Figure 3 is a corresponding end view.

Figure 4 is a diagrammatic view of a modification.

Figure 5 is a diagrammatic view of a further modification.

Side plates 1, 2, are adapted to secure a laminated iron yoke 3 and also support the bearings 4, 5, for a pair of rollers adapted to act as guides for the wire rope or the like article 6, which is to be tested.

To enable the testing device to be placed around the wire rope even when the ends of this are not necessarily accessible, the body 1, 2, of the yoke is provided with caps 7, 8, hinged at 9, 10, to the body and secured by means, such as butterfly nuts 11. The caps 7, 8, are similarly provided with spindles 12, 13, for supporting a bearing of guide pulleys co-operating with the guide pulleys 4, 5, of the rope.

The shank or arm of the yoke is provided with an exciting coil 14, preferably supplied with energizing current of low frequency from an alternator 15. A suitable frequency is found to be one about 16 cycles per second, when for instance, a locked coil type of winding rope is to be tested. By using low frequency alternating currents, skin effects are rendered practically negligible.

The yoke has its arms slotted as shown at 16, and 17, to accommodate a search coil 19. This search coil is arranged to be perfectly symmetrical with respect to a plane which is perpendicular to the rope 6 and lies midway between the arms of the yoke, so that when the exciting coil 14 is supplied with alternating current there will be no resultant E. M. F. induced in the search coil 19 when the portion of the rope 6 under test in the region of this search coil 19 is sound and magnetically homogenous.

This search coil 19 is in circuit with an amplifying and rectifying device of any desired type shown diagrammatically at 20, the final circuit of which includes an indicating instrument 21. Instead of the indicating instrument 21 an automatic recording instrument may be used.

Now it is known that mechanical strain produces an effect on the permeability of iron rope, and this troublesome phenomenon has hitherto hendered the effective detection of flaws in ropes by electromagnetic methods. By the arrangement described, however, this difficulty can be practically overcome, in so far as the observing of real flaws in the rope is concerned for the reason that the portion of the rope 6 in the neighbourhood of the search coil 19 can be magnetized to a relatively high value of induction, thus greatly diminishing the relative effect of mechanical strain on the permeability and also because in effect, the relatively small area covered by the search coil system makes it unlikely that any great difference of mechanical strain will exist over that length of rope which will at any time, determine the resultant E. M. F. in the search coil system 19. Directly however, a ruptured portion of the rope approaches one side 17 or 16 of the search coil 19 the portions of the flux which link the search coil system, will be disturbed and a reading given on the indicator 21, as it follows that when the exciting coil 41 is supplied with alternating current of suitable magnitude and frequency, a magnetic flux will be produced, a portion of which will be linked by the search coil 19, and will pass through the two arms of the yoke and the portion of the rope situated between these two arms. There is thus a concentration of flux in that part of the rope between the arms with a relatively small flux density in the air space between the rope and the surface of the respective holes in the arms. In other words, there will be in effect, a large number of magnetic paths in parallel, all of which will pass through that part of the rope between the arms and through the shank of the yoke over which the exciting coil 14 is wound.

It will be noticed that the air space between the rope and the surface of the perforations in the arms of the magnetic yoke is arranged to be of relatively considerable length in the direction of the lines of force which cross these air spaces.

It is further important to note that as the rope passes through the testing apparatus, a given portion on entering the hole in one arm of the yoke is subjected to a cyclic change at the frequency of the alternating current supply, and as this portion of the rope progresses through the hole in the said arm, the flux density limits of the cycle become gradually increased until it reaches the end of the arm, so that any portion of the rope has reached a more or less steady cyclic state before it reaches the search coil system, and thus the effect of any residual magnetism which may have remained in the rope from a previous test or from any other cause, is eliminated.

The search coil 19 is preferably arranged as indicated, as the portion of the flux which passes through one of the inner parallel branches formed by the laminations is to be preferred for purposes of examination to detect a flaw since the magnetic reluctance of an inner branch will be smaller than that of an outer branch, and the effect of a given flaw on the flux passing along an inner branch will be greater than its effect on the flux which passes along an outer branch.

It will be preferable to provide a balancing E. M. F. in the search coil which opposes the E. M. F. induced in it, as it the balancing E. M. F. is of the correct frequency wave form and R. M. S. value, it can be so arranged that the indicator 21 will indicate zero or approximately zero when the part of the rope which is passing in the neighbourhood of the search coil is sound, but that when a flawed portion of the rope is passing near the search coil an out of balance E. M. F. will be developed in the search coil 19 to be immediately indicated upon the indicator 21.

Instead of a single self-balancing coil 19, a pair of electrically opposed windings 23, 24, may be provided, one on each limb of the yoke 25, the shank of which is provided with the exciting coil 26, as shown in Figure 5. These search coils 23, 24, must of course, be symmetrically arranged on the arms and connected in electrical opposition, so that each search coil produces the balancing E. M. F. for the other.

A further modified arrangement is shown in Figure 4 where a single search coil 27 is shown on one arm only of the yoke 28, embracing the rope 6 to be tested.

The applications of the present invention include the testing of steel wire ropes used for winding and haulage in collieries and other installations, the steel ropes used in bridge construction, in cranes, or in mooring ropes for airships, steel rails, and other steel and iron articles of length great compared with the lateral dimensions and of which the sectional contour is uniform over the length which is to be tested.

Tests made by means of the apparatus made and arranged in accordance with this invention will discover mechanical flaws which are a small percentage of the total cross section and such tests involve no direct application of mechanical strains to the rope or other material which is being tested.

I declare that what I claim is:

1. A device for testing magnetizable articles, consisting of a laminated iron yoke, the arms of which are perforated parallel to the shank, an exciting coil wound on said shank and a search coil wound in symmetrical slots in said perforated arms.

2. A device for testing magnetizable articles, consisting of a laminated iron yoke, the arms of which are perforated parallel to the shank, an exciting coil wound on said shank and a search coil wound in symmetrical slots in said perforated arms, and situated adjacent the inner sides of said arms.

3. A device for testing magnetizable articles, consisting of a laminated iron yoke, the arms of which are perforated parallel to the shank to receive the article to be tested, by perforations of considerable length as compared to their cross sectional dimensions of cross sectional area substantially greater than that of the article under test so as to provide a relatively large clearance between the article and the yoke, an exciting coil on said shank and a search coil symmetrically disposed on the arms of said yoke with its axis at a right angle to the article.

4. A device for testing magnetizable articles, consisting of a laminated iron yoke, the arms of which are perforated parallel to the shank to receive the article to be tested, by perforations of considerable length as compared to their diameter, an exciting coil on said shank, a search coil symmetrically disposed on the arms of said yoke with its axis at a right angle to the article, and pairs of guide rollers for guiding a wire rope through said perforations.

5. A device for testing wire ropes consisting in a laminated iron body comprising a shank and two symmetrically disposed arms, an exciting coil wound on said shank, caps on each of said arms hinged thereto, and provided with grooves opposite grooves in said laminated body to form when closed, perforations long as compared with their diameter and parallel to said shank and a search coil on said arms.

6. A device for testing wire ropes consisting in a laminated iron body comprising a shank and two symmetrically disposed arms, an exciting coil wound on said shank, caps on each of said arms hinged thereto, and provided with grooves opposite grooves in said laminated body to form when closed, perforations of diameter substantially greater than that of the ropes, long as compared with their diameter, and parallel to said shank and a search coil on said arms.

7. A device for testing wire ropes consisting in a laminated iron body comprising a shank and two symmetrically disposed arms, an exciting coil wound on said shank, caps on each of said arms hinged thereto, and provided with grooves opposite grooves in said laminated body to form, when closed, perforations long as compared with their diameter and parallel to said shank and a search coil wound symmetrically in a pair of slots adjacent the inner sides of said arms, which slots are at right angles to the perforations through them.

8. A device for testing wire ropes consisting in a laminated body of iron comprising a shank and two symmetrically disposed arms, an exciting coil wound on said shank, caps on each of said arms hinged thereto, and provided with grooves opposite grooves in said laminated body to form, when closed, perforations long as compared with their diameter and parallel to said shank and a search coil wound symmetrically in a pair of slots adjacent the inner sides of said arms, and at right angles to the perforations through them, the winding round one tongue so formed of one arm being in opposition to the winding on the other tongue of the other arm.

In witness whereof, I have hereunto signed my name this 6th day of December, 1928.

THOMAS FREDERICK WALL.